United States Patent [19]
Kawamura et al.

[11] 4,074,315
[45] Feb. 14, 1978

[54] APPARATUS FOR REPRODUCING MULTIPLEX VIDEO DATA

[75] Inventors: Hiroshi Kawamura; Yoshihisa Nishitani; Katsumi Muta, all of Nagaokakyo, Japan

[73] Assignee: Mitsubishi Denki Kabushiki Kaisha, Tokyo, Japan

[21] Appl. No.: 690,729

[22] Filed: May 27, 1976

[30] Foreign Application Priority Data

| June 6, 1975 | Japan | 50-68196 |
| Feb. 2, 1976 | Japan | 51-10211 |
| Feb. 2, 1976 | Japan | 51-10212 |
| Feb. 2, 1976 | Japan | 51-10213 |

[51] Int. Cl.² ............................................ H04N 7/00
[52] U.S. Cl. .............................. 358/142; 340/324 AD
[58] Field of Search ................ 358/74, 142, 147, 163, 358/169, 171, 182, 183, 242; 340/324 AD; 315/365, 383, 386, 30

[56] References Cited
U.S. PATENT DOCUMENTS

| 3,336,587 | 8/1967 | Brown | 340/324 AD |
| 3,984,828 | 10/1976 | Beyers, Jr. | 340/324 AD |

*Primary Examiner*—Robert L. Richardson
*Attorney, Agent, or Firm*—Oblon, Fisher, Spivak, McClelland & Maier

[57] ABSTRACT

An apparatus for reproducing multiplex video data which records data for symbols multiplexed with the main video signals in a memory and continuously reads out the data from the memory and multiplexes it with a part of the main video signals for display, including circuitry for controlling the amplitude of the main video signals corresponding to the superposed picture background during the display time for the multiplexed data which are read out from the memory.

5 Claims, 19 Drawing Figures

APPARATUS FOR REPRODUCING MULTIPLEX VIDEO DATA

BACKGROUND OF THE INVENTION

1. Field of the Invention

The present invention relates to an apparatus for reproducing symbol signals which are time-division-multiplexed with a video signal during the vertical blanking interval of the video signal, as symbol data on a television receiver (hereinafter referred to as TV receiver).

2. Description of the Prior Art

Heretofore, in the case of superposition of symbol information on a picture of the TV receiver, the symbol data is either reproduced in the color green or in full color and video signals whose display corresponds to the time the video forms a background for the superposed symbol data are erased and replaced with a suitable uniform color; or the video signal level during this time and the symbol signals are given as multiplex signals.

In the latter method, when the video data of the TV signal serving as the background of the superposed symbols includes white peak symbols such as time symbols or a commercial message, even though the symbol data given by the multiplex signals is superposed on it, two kinds of symbol data are superposed with each other whereby the symbol data can not be read out.

In the former case, there is no such problem, however, since the video data at the part for superposing the symbol data is disadvantageously erased. With regard to the erasing time, in the case that the symbol size is 36 vertical lines by 2 rows at 48 lines per row as the horizontal scanning line number, the total number of scanning lines for the multiplex time of the symbol signal is 96.

In the case that the upper and lower spaces require 20 lines respectively, the total number of scanning lines for the multiplex time is 136 which corresponds to about ⅓ of the total effective scanning lines of 435 lines on the picture of TV receiver. (The total number of scanning lines is 525, the number of scanning lines for the vertical blanking interval is 42 and the number of scanning lines for 10% over scan is 48). Accordingly, about ⅓ of the video signal is erased in the latter superposing method.

When broadcasting contents are decided under the consideration of the erasing time, the broadcasting contents are highly affected by the superposing time.

SUMMARY OF THE INVENTION

It is an object of the present invention to provide an apparatus for reproducing multiplex symbol signals which provides clear superposed symbols without erasing the background of the superposed symbols regardless of the video signal content at the background.

It is another object of the invention to provide an apparatus for reproducing multiplex data which can clearly display multiplex data when present.

DETAILED DESCRIPTION OF THE PREFERRED EMBODIMENTS

Figure 1:
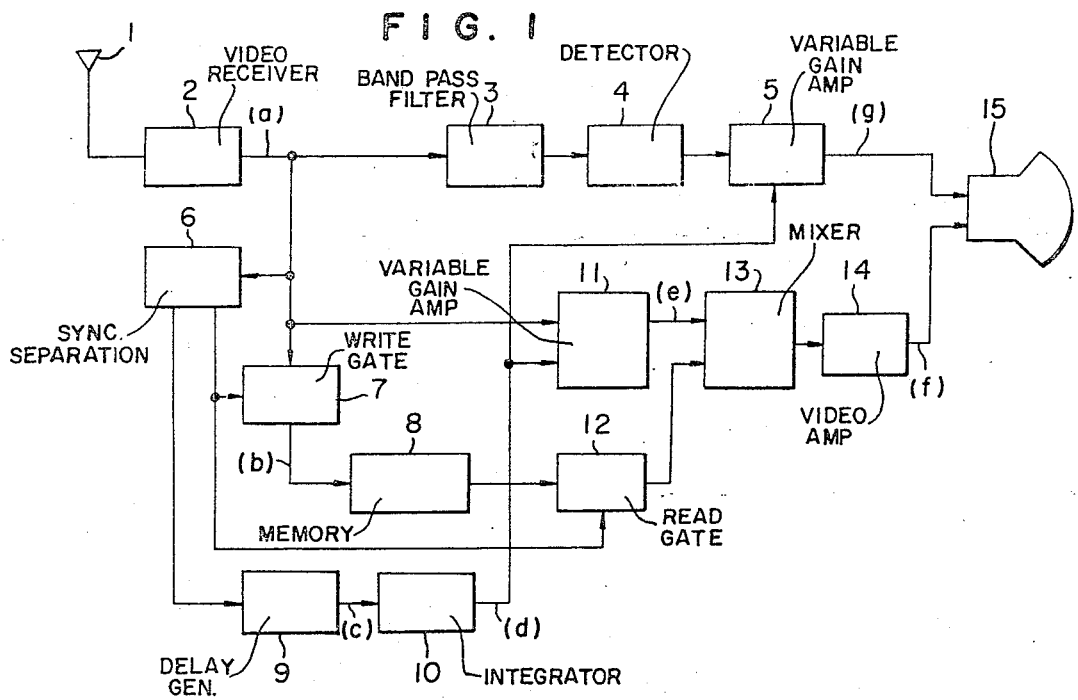
FIG. 1 is a block diagram of one preferred embodiment for reproducing video data in accordance with the present invention.

Referring to the drawings, one embodiment of the present invention will be illustrated.

Figure 2:
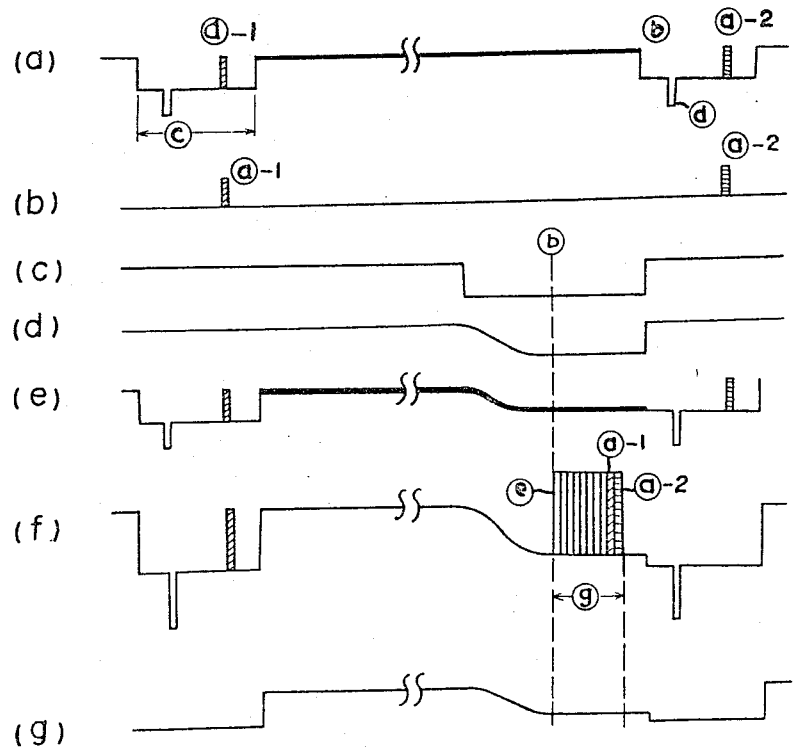
FIGS. 2(a) – (g) show diagrams of signal waveforms at the points a to f in FIG. 1.

FIG. 1 is a block diagram of one preferred embodiment of the invention and FIGS. 2 (a) –(g) show diagrams of signal waveforms at the points a to f in FIG. 1.

In FIG. 1, the reference numeral 1 designates an antenna; 2 designates a composite video signal receiver which comprises a tuner, an IF amplifier and a detector circuit and is connected to the antenna 1 and outputs composite video signals; 3 designates a band-pass filter for color signals which receives the composite video signals which are output from the composite video signal receiver 2; 4 designates a detector circuit for color signals passed through the band-pass filter; 6 designates a synch-signal separation circuit connected to the composite video signal receiver 2; 7 designates a write-in gate circuit which is connected to the composite video signal receiver 2 and the synch-signal separating circuit 6 and selects only time-division-multiplex symbol data from the composite video signals which are output from the composite video signal receiver 2; and the write-in gate circuit 7 outputs only the symbol data (which are multiplexed during the vertical blanking interval) to a memory 8.

The reference numeral 9 designates a delay pulse generating circuit which is connected to the synch-signal separating circuit 6 and generates the pulse which delays the vertical synch-signal output from the synch-signal separating circuit for a suitable time; 10 designates an integration circuit 10 connected to the delay pulse generating circuit; 11 designates a variable gain amplifier which is connected to the composite video signal receiver 2 and the integration circuit 10 and can vary the degree of amplification of the composite video signal generated from the composite video signal receiver 2 depending upon the output of the integration circuit 10; 12 designates a read-out gate circuit which outputs series symbol information outputted from the memory 8 only for suitable time; 13 designates a mixer for multiplexing the symbol data passed through the readout gate circuit 12 with the output of the variable gain amplifier 11; 14 designates a video amplifier for amplifying the output of the mixer 13 to the level needed for driving a cathode tube 15; and 5 designates a variable gain amplifier for variable-amplification of the output of the color detector circuit 4 depending upon the output of the integration circuit 10.

The operation of the above-mentioned circuit will be illustrated referring to the voltage waveforms of the signals shown in FIG. 2 at various points. The case of superposed display of symbol data at the lower part of the picture on the TV receiver is shown in FIG. 2.

The waveform at the a point of the composite video signal receiver 2 is the composite video signal (APL 100% white signal) shown in FIG. 2(a) wherein ⓐ–1 and ⓐ–2 designate symbol data which are multiplexed during the vertical blanking interval ⓒⓑ designates a color signal component; and ⓓ designates a vertical synch-signal.

Only symbol data ⓐ are selected from the composite video signal at the *a* point by the write-in gate circuit 7 (waveform of FIG. 2(b)) and recorded sequentially in the order in which they are received as ⓐ−1, ⓐ−2 .. ..ⓐ−n in the memory 8. The write-in gate circuit 7 is actuated by the horizontal and vertical synch-signals generated from the synch-signal separating circuit 6.

The recorded symbol data are synchronously read out to the picture scan by the read-out gate circuit 12 so as to display them at suitable positions on the picture of TV receiver. The read-out time corresponds to the symbol displaying time ⓖ in FIG. 2.

In the meantime, the output of the delay pulse generating circuit 9 generates a pulse which falls prior to the symbol display initiation time ⓔ and rises near the vertical synch-signal in the next field as shown in FIG. 2(c). This pulse is integrated by the integration circuit 10 to provide the slow gradient waveform shown in FIG. 2(d).

The output of the integration circuit 10 is fed to the variable gain amplifier 11 causing the gain of the variable gain amplifier 11 to decrease only during the symbol display time ⓖ and the composite video signals to have low contrast under low luminous level only during the symbol displaying time ⓖ as shown in FIG. 2(e).

The symbol data passed through the read-out gate circuit 12 are multiplexed with the composite video signals at the *e* point.

The multiplex level is selected to be sufficiently high relative to the white peak of the composite video signals for clear viewing of the symbols as shown by ⓔ of FIG. 2(f).

As it is not natural to produce a sharp dark part at the symbol displaying position on the picture of TV receiver, it is preferable to give a smooth gradient to the gain controlling signal (FIG. 2(d) ) generated from the integration circuit 10.

When the video signals having the multiplexed symbol data are passed through the video amplifier 14 for display on the cathode tube 15, the disadvantages of conventional apparatuses (complete erasure of part of the picture; inability to distinguish symbols from a white signal background of symbols etc.) can be overcome and the symbols can be clearly distinguished.

When the gain of the color signal is decreased by the variable gain amplifier 5 only during the symbol displaying time under synchronizing of the video signals as shown in FIG. 2(g), the color signals are balanced with the video signals to obtain a natural picture.

In the embodiment, the symbol data displayed on the picture are advantageously not connected to the color circuit so that there is no cross color caused by harmonic waves near the symbols.

As stated above, in accordance with the embodiment, the symbols can be clearly displayed on the cathode tube 15 with control of the amplitude of the main video signals and the amplitude of the color signals for the symbol background.

The optimum ratio of amplitude control of the main video signals for the symbol background is dependent upon the condition of the main video signal. When the main video signals give a dark picture, about ¾ of full amplitude is sufficient.

When the main video signals include a white peak signal as a symbol signal or give a light picture, about ½ is required. However, the data for the dark picture are relatively less, and the ratio of amplitude control is preferably about ½.

In general, the signal for the symbol ① is multiplexed as a signal of high white level (high luminance). Accordingly, when the main video signals for the symbol background are signals of high white level, two kinds of signals having different data but the same white level are displayed in superposition whereby it is hard to find the contents of the symbols and the main video image.

In the following embodiment of the invention, the high white level of the main video signal for the symbol ① background is compressed, that is the luminance thereof is decreased from the luminance of the symbols ① whereby the difference in luminance of the symbols ② of the main video image and the symbols ① allows the letter to be distinguished without erasing the main video image.

Figure 3:
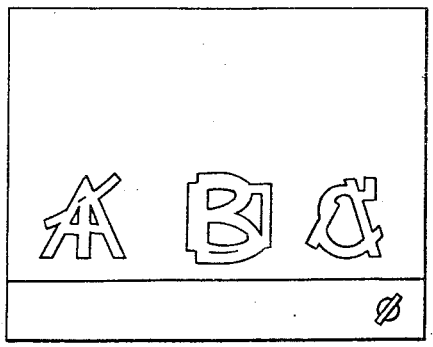
FIGS. 3 and 4 are schematic views of superposed symbol data on a picture of TV receiver.

For example, when the symbols ① of A, B and C and the symbols ② of τ , □ and /\ in the main video image are superposed under the same luminance, as shown in FIG. 3, it is hard to find both of the symbols A, B, C and τ , □, /\.

Figure 4:
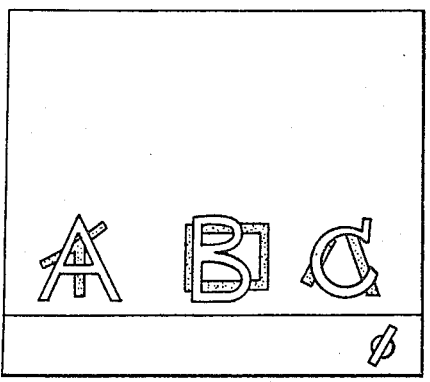

On the contrary, when the luminance of the symbols of τ , □, / in the main video image is decreased as shown in FIG. 4, the symbols A, B and C can be clearly distinguished and also, the symbols τ , □ and /\ in the main video image are easily distinguished. When the symbols in the main video image are only numerals e.g. for time-information scores in a baseball game, it is even easier to distinguish the symbols.

In general, in order to make the display of the symbols ① clear, it is necessary to decrease the amplitude of the white peak signal in the main video signals to about 40%. When the amplitudes are compressed in the same ratio of compression regardless of the signal level (luminous level) of the main video signals, the signals in the intermediate level of 20 to 60% which are mainly used cause too dark a display as shown in FIG. 5ⓒ.

In the following embodiment, the amplitudes of the main video signals for the background of the symbols ① are uniformly decreased in a relatively small ratio of compression while preventing too dark a display for the signals in the intermediate level of about 20 to 60% which are mainly used.

Figure 5:
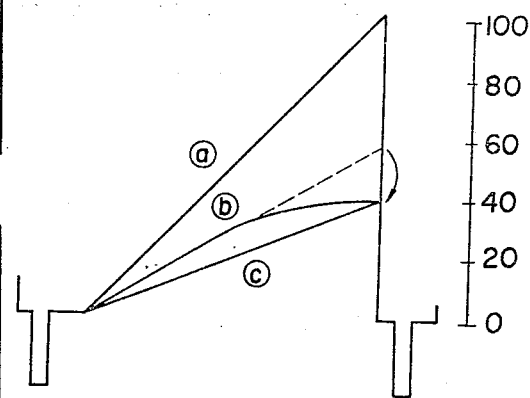
FIG. 5 is a graph of symbol superposing level.

Specifically, the amplitudes of the main video signals are uniformly controlled at a ratio of compression so as to decrease the level of the white peak from 100% to 60% as shown by the dotted line in FIG. 5ⓑ by using the variable gain amplifier.

Then, the amplitudes of the signals in the region higher than the 60% white level (which cause the difficulty in distinguishing the symbols ① in the compressed main video signal are compressed by the limiter circuit below the 40% level as shown by the full line in FIG. 5 ⓑ.

In accordance with this embodiment, the compressed state shown in FIG. 5ⓒ is modified to the compressed state shown in FIG. 5ⓑ by using both the variable gain amplifier and the limiter circuit, and the white signal part of the main video image can be held to the brightness of the intermediate levels of 20 to 60% which are mainly used.

Figure 6:
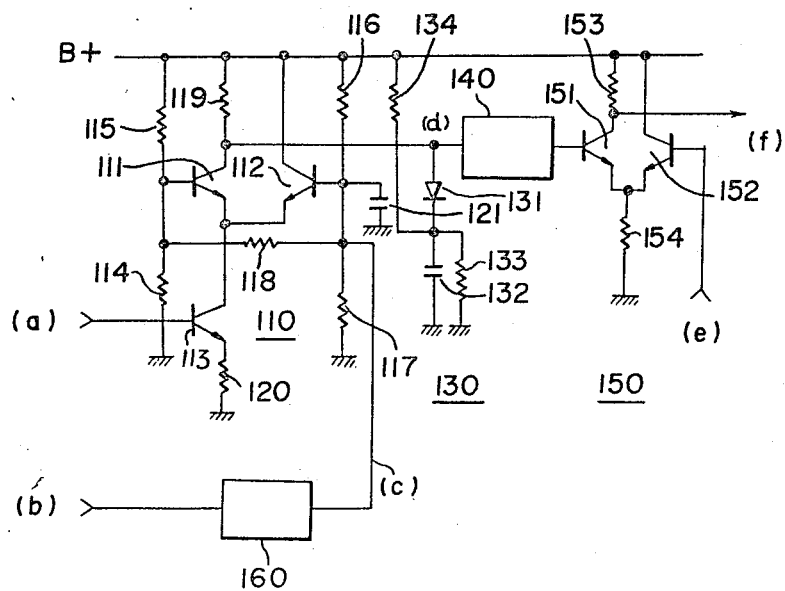
FIG. 6 is a diagram of circuit of one preferred embodiment of the invention.
Figure 7:
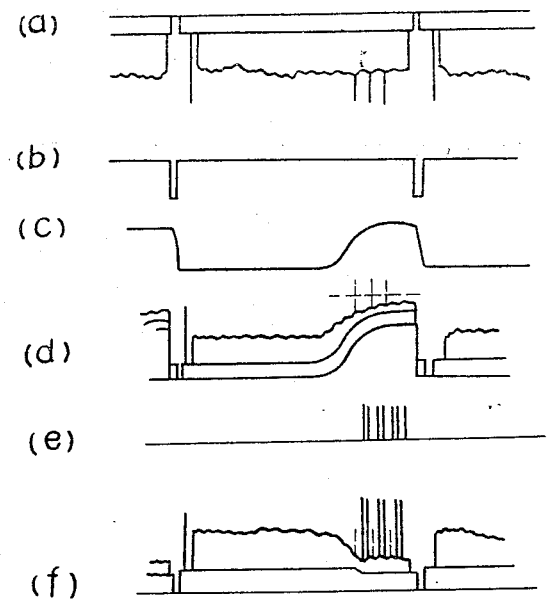
FIGS. 7 a – f show diagrams of signal waveforms at various parts of the circuit.

Referring to FIGS. 6 and 7, the embodiment will be illustrated. FIG. 6 is a diagram of circuit of the embodiment; and FIG. 7 show waveforms of signals at various points.

In FIG. 6, a variable gain amplifier 110 comprises transistors 111, 112, 113. The composite video signals shown in FIG. 7 shown in FIG. 7(a) are applied to the base of the transistor 113, and the emitter of the transistor is grounded through a resistor 120.

The collector is connected to both of emitters of the transistors 111, 112 which form a differential amplifier. The base of one transistor 111 which forms the differential amplifier, is connected to the middle point of the bias resistors 114, 115 which are connected in series between the power source and ground and the collector thereof is connected through the load resistance 119 to the power source. The base of the other transistor 112 is connected to the middle point of the bias resistors 116, 117 which are connected in series between the power source and ground, and the collector thereof is directly connected to the power source.

A resistor 118 for gain control is connected between the bases of the transistors 111, 112.

The trapezoidal waveform generating circuit 160 inputs the vertical synch-signal shown in FIG. 7(b) to output the trapezoidal waveform signal shown in FIG. 7(c). The trapezoidal waveform generating circuit is connected to the base of the transistor 112. The limiter circuit 130 for receiving the output of the variable gain amplifier 110 comprises a diode 131, resistors 133, 134 and a capacitor 132. The anode of the diode 131 is connected to the collector of the transistor 111, and the cathode of the diode is connected to the middle point of the resistors 133, 134 which are connected in series between the power source and ground.

The capacitor 132 is connected between the middle point and ground. A DC restoration circuit 140 includes an inverting amplifier which feeds to a symbols multiplex circuit 150, a DC restoration signal which has reverse polarity to the composite video signals passed through the variable gain amplifier 110 and the limiter circuit 130.

The symbols multiplex circuit 150 comprises transistors 151, 152 and resistors 153, 154.

The base of the transistor 151 is connected to the output terminal of the DC restoration circuit 140.

The emitter thereof is connected together with the emitter of the other transistor 152 through the resistor 154 to ground and the collector thereof is connected through the load resistance 153 to the power source. The signal for the symbols ① shown in FIG. 7 is input to the base of the transistor 152. The collector thereof is directly connected to the power source.

In this embodiment, multiplex signals in the optimum condition as shown in FIG. 7 (f) are obtained from the collector 151.

The operation of the embodiment will be illustrated.

In FIG. 6, the output signals (signals at the collector 111) of the variable gain amplifier 110 can be controlled by the voltage applied to the base of the transistor 112 as known.

When the base voltage of the transistor 112 is sufficiently lower than the base voltage of the transistor 111, the AC gain of the variable gain amplifier becomes maximum whereby the AC amplitude of the output signal is maximum and the DC level is minimum.

When the base voltage of the transistor 112 is sufficiently higher than the base voltage of the transistor 111, the transistor 111 is cut off whereby the AC amplification of the output signals is zero and the DC level is maximum.

As the base voltage of the transistor 111 is constant, the AC amplitude and the DC level of the output signals can be controlled by varying the base voltage of the transistor 12.

For example, when the trapezoidal waveform signal which is synchronized to the vertical scanning period and is at high level during the time for superposing the symbols ① as shown in FIG. 7(c) is applied in the case of superposing the symbols ① at the lower part of the picture as shown in FIG. 4, the trapezoidal waveform signal which has maximum AC amplitude and minimum DC level at the bottom and small DC amplitude and high DC level at the upper part (FIG. 7(d) can be obtained as the output of the variable gain amplifier.

Accordingly, when the level of the trapezoidal waveform signal is controlled, the amplitude of the main video signals can be limited to lower than 60% of the white peak level as shown by the dotted line of FIG. 5 (b).

The signals (FIG. 7(d)) are fed to the limiter circuit (130) wherein the level of the white signals is compressed for example, to 40% of the white peak signal.

The part shown by the dotted line in FIG. 7(d) are the amplitudes of the white peaks of the composite video signals in the case of no limiter circuit 130. This fact shows that the limitation of white peaks is not enough without use of the limiter circuit.

When the polarity of the limiter circuit is given as shown in FIG. 6, the limiter circuit can be actuated only during the suitable time, because of the high DC level at the part for superposing the symbols ① as shown in FIG. 7(d).

The signals shown in FIG. 7(d) are passed through the DC regenerative circuit 140 in the inverting amplifier and the symbols multiplex circuit 150 whereby the output signals for superposing the symbols as shown in FIG. 7(f) can be obtained.

The parts shown by the dotted lines in FIG. 7(f) are amplitudes of the white peak signals of the main video signals in the case when no limiter is used. In that case, the white level of the main video signals is near the white level of the signal for the superposed symbols ① whereby the symbols ① cannot be clearly distinguished.

When the level of the white peak of the main video signals is decreased from the level of the white peak of the symbols ① enough to easily distinguish the symbols ① without using the limiter, the intermediate level of the main video signals decreases to about the black level, whereby the main video images for the background of the superposed symbols ① are too dark to clearly distinguish the contents of the main video images for most of the pictures.

In accordance with the embodiment of the apparatus for reproducing multiplex data of the invention, the main video signals can be controlled to a suitable intermediate level during the time of superposing of the data such as symbols which are transmitted as multiplex signals by a simple structure using a variable gain amplifier and a limiter circuit whereby the content of the main video image on the background can be distinguished while clearly distinguishing the data in the reproduction.

It is effective to uniformly decrease the amplitude of the main video signals during the time of superposing the symbols ① just short of distinguishing the contents of the picture and to further decrease only the amplitudes of the video signals which rapidly repeat in dark and bright.

When the amplitudes of the main video signals are uniformly decreased just short of distinguishing the superposed symbols ①, all of the intermediate levels of the main video signals are decreased to within the black level whereby the main video images for the background of the superposed signals ① are too dark to find the contents for most of the pictures. In order to improve it, in this embodiment, the amplitudes of only the video signals which rapidly repeat in dark and bright, are controlled by the capacitor 121 connected between the base of the transistor 112 and ground without substantially decreasing the intermediate levels of the video signals.

During the time when the upper part of the trapezoidal waveform signal of FIG. 7(c) is applied to the base of the transistor 112 (time for superposing symbols ①), that is, the turn-on times of both of the transistors 111, 112, the high frequency gain for the transistor 112 is increased from the gain of transistor 111 by the capacitor 121 whereby the ratio of compression for high frequency components among the video output signal at the collector of the transistor 111 is increased.

Figure 8:
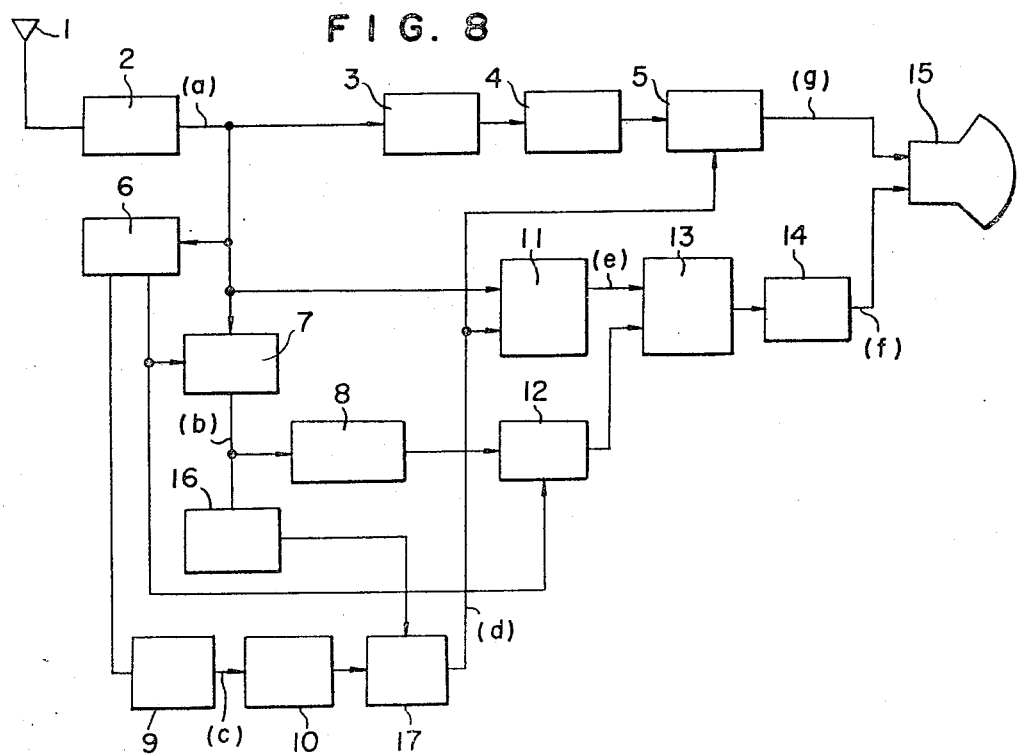
FIG. 8 is a block diagram of the other embodiment of the invention.

In the embodiment of FIG. 8, a detector circuit 16 for the multiplex data and a gate circuit 17 are added to the circuit of FIG. 1.

The detector circuit 16 detects the presence of the multiplex data passed through the write-in gate circuit 7 (multiplex data selecting gate circuit) for transmission to the output of the gate circuit 17.

The gate circuit 17 passes the trapezoidal waveform signal (FIG. 2(d)) of the output signal of the integration circuit (10) to the variable gain amplifying circuits 11 and 5 when enabled by the output of the detector circuit 16 when the multiplex data are provided.

On the other hand, the gate circuit 17 prevents passage of the trapezoidal waveform signals when the multiplex data are not provided.

Accordingly, in accordance with the embodiment, the presence of the multiplex data is detected, and when the multiplex data are provided, the amplitudes of the main video signals and the color signals for the multiplex video data background are modified to display the multiplex video data on the picture of the TV receiver.

In the conventional apparatus, the circuit for displaying the multiplex video data is not provided.

It permits the display of the multiplex data when the data are not always multiplexed in all of the broadcasting stations at all times.

What is claimed as new and desired to be secured by letters patent of the United States is:

1. An apparatus for reproducing multiplex video data comprising:
   receiver means for outputting composite video signals, said composite video signals including main video signals having a vertical blanking interval and symbol data multiplexed with the main video signals during the vertical blanking interval;
   write-in gate means for selecting the symbol data from the composite video signals outputted by said receiver means;
   memory means connected to said write-in gate means and responsive to to selecting of symbol data for recording the selected symbol data;
   read-out gate means for reading out the symbol data recorded in said memory means; and
   means for superposing the symbol data read out by said read-out gate means with the composite video signals outputted by said receiver means to produce a resultant signal for visual display, including means connected to said receiver means for controlling the amplitude of the main video signals in the composite video signals outputted by said receiver means and corresponding to the superposing background for the symbol data, and mixer means connected to said read-out gate means and said amplitude controlling means for multiplexing the symbol data read-out by said read-out gate means with the composite video signals having a main video signals amplitude controlled by said amplitude controlling means to produce a resultant signal for visual display.

2. The apparatus for reproducing multiplex video data recited in claim 1 wherein said amplitude controlling means includes:
   means for reducing the amplitude of the main video signals in the composite video signals outputted by said receiver means and corresponding to the superposing background for the symbol data to 3/4 of the amplitude of the other main video signals.

3. The apparatus for reproducing multiplex video data recited in claim 1 wherein said amplitude controlling means includes:
   variable gain amplifier means for uniformly compressing the main video signals corresponding to the superposing background for the symbol data, said main video signals including a white signal; and
   limiter means connected to said variable gain amplifier means for further compressing the white signal in the uniformly compressed main video signals.

4. The apparatus for reproducing multiplex video data recited in claim 1 wherein said amplitude controlling means includes:
   variable gain amplifier means for compressing the main video signals in the composite video signals outputted by said receiver means and corresponding to the superposing background for the symbol data, said variable gain amplifier means including control means for varying the compression ratio of the high frequency components of the main video signals relative to the compression ratio of the other components of the main video signals.

5. The apparatus for reproducing multiplex video data recited in claim 1 wherein said amplitude controlling mans includes detector means connected to said write-in gate means for detecting the selecting of symbol data from the composite video signals and is responsive to the detecting of the selecting of symbol data.

* * * * *